J. W. Thompson.
Mower.
No. 3391. Reissued. April 20. 1869.
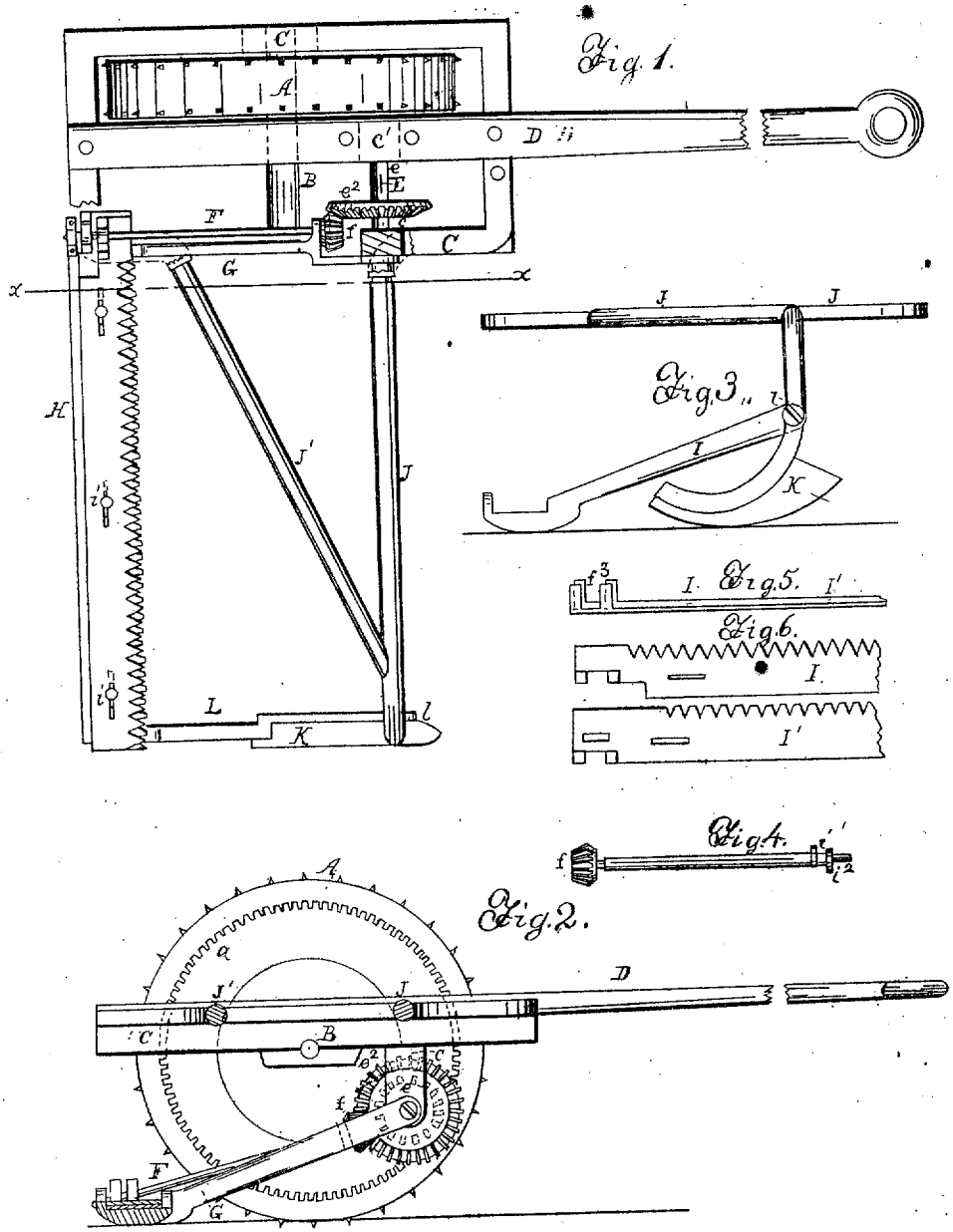
Witnesses
Joe S. Peyton,
Walter De Long
S. M. Bowler
by his Atty
Wm. D. Bald

UNITED STATES PATENT OFFICE.

ELDRIDGE M. FOWLER, OF BAY CITY, MICHIGAN, ASSIGNEE OF JOHN W. THOMPSON.

IMPROVEMENT IN MOWING-MACHINES.

Specification forming part of Letters Patent No. 15,354, dated July 15, 1856; reissue No. 3,391, dated April 20, 1869.

DIVISION A.

*To all whom it may concern:*

Be it known that JOHN W. THOMPSON, of Greenfield, in the county of Franklin and State of Massachusetts, invented certain new and useful Improvements in Mowing-Machines, of which the following is a full, clear, and exact description.

The invention herein claimed relates to that class of mowing-machines in which a cutting apparatus is so suspended from a main frame as to be free to rise and fall to conform to the undulations of the surface over which it is drawn without disturbing the motions of the main frame or impeding the working of the gearing; and the improvements herein claimed consist, first, in a novel method of combining a cutting apparatus in rear of the main axle with the main frame by means of hinged arms, freely vibratable about an axis coincident with a counter-shaft or gear-center in the front of the main axle; second, in a novel method of combining a cutting apparatus with a coupling-frame vibrating about an axis coincident with a counter-shaft, having its bearings in pendants below the main frame and in front of the main axle; third, in a novel method of combining a rigid tongue, a main frame, oscillating on the main axle of the machine, a counter-shaft, turning in pendants below the main frame, in front of the main axle, and a shaft for reciprocating the cutters driven from said counter-shaft, and vibratable freely up and down with the cutting apparatus, around an axis coincident with said shaft, independently of the main frame; fourth, in a novel method of combining a cutting apparatus, vibratable vertically about an axis coincident with a gear-shaft in front of the main axle, with a shaft for reciprocating the cutters crossing the main axle, and vibrating with the cutting apparatus; fifth, in a novel method of combining a divider, supported by a laterally-projecting portion of the main frame, with a coupling-arm, supporting the divider end of a vibrating cutting apparatus.

In the accompanying drawings, Figure 1 represents a plan or top view of a mowing-machine embodying all of said improvements; Fig. 2, a view of the same, partly in elevation and partly in section, at the line *x x* of Fig. 1; Fig. 3, a view in elevation of the supporting-frame detached, as seen from the divider side; Fig. 4, a view of the shaft which reciprocates the cutters detached; Fig. 5, an elevation; and Fig. 6, a plan of the cutters detached.

A driving-wheel, A, turns with an axle, B, mounted in a main frame, C, from which a rigid tongue, D, projects. An internally-geared spur-wheel, *a*, on the driving-wheel, drives a corresponding pinion, *e*, (shown in dotted lines in Fig. 2,) on a counter-shaft, E, having its bearings in pendants *c c'* (only one of which shows in the drawing, the other being beneath the tongue) in front of the main axle. The counter-shaft E carries a bevel-wheel, $e^2$, gearing into a corresponding pinion, *f*, on the front end of a shaft, F, turning in bearings on an arm, G, pivoted to play freely vertically around the counter-shaft. The inner or heel end of the finger-beam H is secured to the vibrating hinged arm in such a manner that the two rise and fall together. The cutting apparatus, in this instance, consists of two scalloped cutters, I I', placed one above the other, held down by pins *i*, which enter longitudinal slots in the plate, and vibrated by cams $i^1$ $i^2$ on the shaft F, which play in lugs $i^3$ in the cutters.

In order to carry out the last part of the invention, an overhanging arm, J, is projected from the main frame, and vertically over the counter-shaft, as far as the divider. This arm is strengthened by a brace, J'. The arm J is first curved downward, and then rearward, a distance a little greater than the semi-diameter of the driving-wheel, and is armed with a dividing-shoe, K, to separate the grass to be cut from that to be left standing. An arm, L, attached to the divider end of the cutting apparatus, is pivoted to the arm J at *l*, which point is in line with the counter-shaft E, so that this arm L is free to vibrate also.

As the axis of movement of the arms G L is coincident with the counter-shaft, it will readily be perceived that the upward and downward movements of the cutting apparatus will not change the relative position of the bevel-wheel on the counter-shaft with the bevel-pinion on the shaft F, and therefore the cutting apparatus can adapt itself to every inequality of the surface without, in the slightest degree, straining or disarranging the combination of parts that serve to communicate motion from the main driving-wheel to the cutters.

What is claimed herein as the invention of said THOMPSON is—

1. The combination, substantially as set forth, in a mowing-machine, of a main frame, oscillating on a main axle, and a cutting apparatus in rear of said axle, and freely vibratable about an axis in front of said axle, coincident with the axis of rotation of the counter-shaft.

2. The combination, substantially as set forth, of a cutting apparatus with a coupling-frame vibrating about an axis coincident with a counter-shaft, having its bearings in pendants from the main frame and in front of the main axle.

3. The combination, substantially as set forth, of a rigid tongue, a main frame oscillating on a main axle, a counter-shaft turning in pendants below the main frame, in front of the main axle, and a shaft for reciprocating the cutters, driven from said counter-shaft, and vibratable freely with the cutting apparatus, around an axis coincident with said counter-shaft, independently of the main frame.

4. The combination, substantially as set forth, of a cutting apparatus, vibratable vertically about an axis coincident with a gear-shaft in front of the main axle, with a shaft for reciprocating the cutters, crossing the main axle and vibrating with the cutting apparatus.

5. The combination, substantially as set forth, of a separating-divider, supported from the main frame, with a vertically-vibratable coupling-arm.

ELDRIDGE M. FOWLER,
*Assignee.*

Witnesses:
L. BECKWITH,
J. C. LEWIS.